United States Patent [19]
Bratton et al.

[11] Patent Number: 5,798,940
[45] Date of Patent: Aug. 25, 1998

[54] IN SITU OXIDATION REDUCTION POTENTIAL MEASUREMENT OF SOILS AND GROUND WATER

[76] Inventors: Wes Bratton, R.R. 1, Box 120A, South Royalton, Vt. 05068; Daniel James Rooney, Woodhaven Manor 7-D, White River Junction, Vt. 05001

[21] Appl. No.: 677,362

[22] Filed: Jul. 5, 1996

[51] Int. Cl.⁶ .................................................. G01V 3/34
[52] U.S. Cl. .......................... 364/498; 364/496; 364/497; 204/415; 204/421; 204/435; 204/406
[58] Field of Search ..................... 364/496–499, 364/420, 421, 481, 483, 550, 557, 570; 73/84, 85, 864.64, 864.74, 863.23, 152.09, 152.11, 866.5, 866; 250/253, 255, 261, 262; 405/128, 130; 204/415, 421, 435, 400, 406, 414, 416, 433, 420, 280, 412, 288, 289; 324/664, 690, 437–439, 347–349; 436/28

[56] References Cited

U.S. PATENT DOCUMENTS

| | | | |
|---|---|---|---|
| 3,623,359 | 11/1971 | Kloc | 73/84 |
| 4,452,091 | 6/1984 | Richers | 73/864.52 |
| 4,492,111 | 1/1985 | Kirkland | 73/84 |
| 4,762,991 | 8/1988 | Timmerman et al. | 250/208.3 |
| 4,908,117 | 3/1990 | Kinlen et al. | 204/415 |
| 4,963,815 | 10/1990 | Hafeman | 324/438 |
| 5,042,595 | 8/1991 | Ladanyi | 73/84 |
| 5,128,882 | 7/1992 | Cooper et al. | 364/550 |
| 5,209,129 | 5/1993 | Jaselskis et al. | 73/864.64 |
| 5,218,304 | 6/1993 | Kinlen et al. | 324/438 |
| 5,260,666 | 11/1993 | Dishman et al. | 324/664 |
| 5,316,950 | 5/1994 | Apitz et al. | 436/28 |
| 5,342,510 | 8/1994 | Eden et al. | 210/96.1 |
| 5,497,091 | 3/1996 | Bratton et al. | 324/348 |
| 5,591,902 | 1/1997 | Castagner | 73/84 |

OTHER PUBLICATIONS

Orion Research, Handbook of Electrode Technology, 1982, pp. v, R–1 and R–3. (No date with month).

*Primary Examiner*—Emanuel Todd Voeltz
*Assistant Examiner*—Hal D. Wachsman
*Attorney, Agent, or Firm*—Terrance L. Siemens

[57] ABSTRACT

A ground penetrometer for determining pH and oxidation reduction potential (ORP) of soils. The penetrometer includes an ORP electrode, a pH electrode, reference electrodes, and a temperature sensor. A singular reference electrode device establishes two reference partial electrical circuits complementing the ORP and pH electrodes. The reference electrode device includes an electrolytic chamber isolated from soil being investigated by an ion permeable ceramic barrier. Electrolytic liquids are retained within their chamber. The temperature sensor and the electrical circuits generate voltage or current signals to transducers, which in turn generate data signals responsive to the electrical signals to a microprocessor. The penetrometer, a driver for forcing the penetrometer into the ground, and the microprocessor are carried on a motorized vehicle to and about a site being investigated. The data is stored within the microprocessor and is available for graphic reproduction and transferral to other data handling equipment.

5 Claims, 2 Drawing Sheets

5,798,940

IN SITU OXIDATION REDUCTION POTENTIAL MEASUREMENT OF SOILS AND GROUND WATER

BACKGROUND OF THE INVENTION

1. Field of the Invention

The present invention relates to method and apparatus for determining soil characteristics in situ. More particularly, a probe is propelled into the ground. Sensors located on the probe measure oxidation and reduction potential (hereinafter, ORP) and hydrogen ion activity (pH) and provide instantaneous signals indicative of the same. These signals are recorded, for example in a database, for future analysis and reproduction in other forms, such as graphical.

Soil readings are taken at various depths, and soil penetrations are made at as many points as may be appropriate for the site being investigated. Instantaneous, in situ measurements give highly accurate data. Immediately available readings enable a site to be investigated very economically and quickly. A three dimensional profile of ORP in a site may be developed from this data.

The probe is a cone penetrometer, and is carried aboard a motor vehicle which is driven about the site being investigated. The cone penetrometer includes a reference electrode, a pH electrode, an ORP electrode, and a temperature sensor. These devices communicate with electronic data processing equipment carried aboard the vehicle.

2. Description of the Prior Art

Investigation of soil conditions is required for bioremediation of contaminated sites. Significant characteristics which must be known in determining soil conditions include knowledge of relative ORP and hydrogen ion activity, as well as other factors.

As surface water permeates the soil, it carries dissolved oxygen. This oxygen becomes depleted over time as a result of subterranean chemical and biochemical reactions. A great many reliable inferences regarding subterranean chemical and bioactive conditions may be made when ORP is known.

Current practice in measuring ORP in soils is to obtain core samples and submit these samples to laboratory analysis. While this process provides certain useful information, it falls far short of providing optimal results, since certain problems are inherent in the process.

One problem is that routine handling of samples causes exposure to air. Oxygen from the air can be readily absorbed by the sample, which will then yield distorted results when tested for available oxygen. Also, the passage of time between the time the sample was obtained and when the sample was analyzed can lead to distortions since subterranean conditions may be dynamic and ongoing, rather than static. A third problem is one of economics. The process of transporting samples to a laboratory extends time required for completion of the task, and imposes attendant costs on the process.

In situ analysis of soil conditions is known. In particular, U.S. Pat. No. 5,128,882, issued to Stafford S. Cooper et al. on Jul. 7, 1992, describes a soil penetrometer which investigates soil contaminants. This invention provides real time, in situ analysis. However, unlike the present invention, the device of Cooper et al. is optical, relying upon reflectance characteristics to derive relevant data, and does not monitor temperature. By contrast, the present invention establishes an in situ electrical circuit which employs soil constituents as part of the circuit to determine local ORP conditions, and also includes a temperature sensor.

Another optical probe system enabling in situ, real time analysis is described in U.S. Pat. No. 5,316,950, issued to Sabine E. Apitz et al. on May 31, 1994. The probe includes an optic fiber for conducting excitation radiation, a second optic fiber for conducting resultant fluorescence back for analysis of contaminants, and a strain gauge for analyzing soil type. This device lacks a temperature sensor. By contrast with the device of Apitz et al., the present invention cooperates with the soil being tested to generate a voltage signal indicative of ORP, and also includes a temperature sensor.

U.S. Pat. No. 5,209,129, issued to Edward J. Jaselskis et al. on May 11, 1993, describes a probe which entraps soil samples and enables analytical instruments to operate in situ. The invention is intended for analysis of highly hazardous substances, and is directed to a probe for isolating a collected sample from contact with equipment and personnel conducting analysis. No specific tests or procedures are disclosed. By contrast, the present invention is directed to a determination of ORP, as determined by establishing an electrical circuit comprising components of the novel probe in combination with the soil being investigated, and measuring potential by obtaining a readout in millivolts.

A combination pH and ORP meter employing a probe is shown in U.S. Pat. No. 5,218,304, issued to Patrick J. Kinlen et al. on Jun. 8, 1993. However, unlike the present invention, this probe is unsuitable for ground penetration, and is restricted to insertion into bodies of liquid being monitored. Kinlen et al. provides solid, conductive electrodes disposed upon one end of a cylindrical probe. By contrast, the present invention locates electrodes on the side of the probe, thus protecting the end. The end is conical and is also reinforced, for penetrating soil. The device of Kinlen et al. lacks communication cables for transmitting generated signals to a memory device, and a temperature sensor. By contrast, both of these features are employed in the present invention.

U.S. Pat. No. 4,908,117, issued to Patrick J. Kinlen et al. on Mar. 13, 1990, illustrates a metal/metal salt reference electrode. This electrode is employed in a pH electrode. By contrast, the present invention provides an ORP electrode. Also, the present invention incorporates its respective electrodes in a ground penetrating probe. Unlike the present invention, the device of Kinlen et al. does not include probe apparatus.

U.S. Pat. No. 5,342,510, issued to Todd R. Eden et al. on Aug. 30, 1994, illustrates an application of oxidation reduction potential sensing. Values derived from this analysis lead to inferences of the level of fouling of water in a cooling system. This invention employs conventional probes for analyzing ORP, pH, and conductivity. However, this invention is incorporated into a piping system conducting water. By contrast, the present invention is suitable for probing soils to moderate depths, and does not rely on a prefabricated piping system.

None of the above inventions and patents, taken either singly or in combination, is seen to describe the instant invention as claimed.

SUMMARY OF THE INVENTION

The present invention provides a probe suitable for real time analysis of soil and ground water conditions and in particular, providing immediate, in situ measurements of ORP and pH. It is important to obtain subterranean, in situ measurements since these characteristics are the most accurate and lowest in economic costs.

Subterranean analysis eliminates distorted results arising from above ground exposure of soil samples to oxygen. A single penetration provides a succession of readings at succeeding depths. Thus, a three dimensional profile of ORP in a site characterization is quickly and inexpensively obtained. This analysis is compatible with a cone penetrometer test specified in ASTM D3441-1986.

The probe comprises a cone penetrometer including a reference electrode, an electrode for determining ORP conditions, an electrode for determining pH conditions, and a temperature sensor. The penetrometer and apparatus for driving the same into the ground are carried aboard a wheeled vehicle which is readily transported to a site being investigated, and along the soil surface to various points at the site.

The electrodes are disposed laterally on the side of the penetrometer, so that they effectively contact soil, but are shielded from injurious effects of impacts, pressure from the soil during penetration, and the like. The electrodes are passive in their nature, incorporating chemicals which, in the presence of electron and hydrogen ion activity, generate voltage or current signals responsive to electron and hydrogen ion activity. Signal generation is thus independent of electrical, optical, or other energy inputs for operation.

The electrically active chemicals are housed within a chamber internal to the probe, and communicate with the soil through an ion permeable barrier. The novel barrier is a ceramic member having porosity of predetermined magnitude selected to pass ions, but to obstruct migration of larger particles, for example, electrolyte liquids, such as water molecules, into the soil. Similarly, soil components are prevented from entering the chamber housing the chemicals. The pores are not sufficiently small to interfere with the obstructed particles, but create an affinity between the barrier and the larger particles that substantially prevents migration.

Voltage signals are conducted to a transducer for rendering electrical signals compatible to a microprocessor. A microprocessor is employed to store and enable subsequent retrieval of data.

Accordingly, it is a principal object of the invention to provide apparatus for immediate, in situ development of data relating to ORP of soils at a site being investigated.

It is another object of the invention to avoid distortion of actual soil characteristics by exposure of samples to airborne oxygen.

It is a further object of the invention to monitor local soil temperature when analyzing soil characteristics.

Still another object of the invention is to provide data storage and retrieval capability of data obtained by the novel probe.

An additional object of the invention is that the probe be readily portable both to the site and to various points thereon.

It is again an object of the invention to monitor pH of the soil.

Yet another object of the invention is that the probe generate data signals by passively, not relying upon electrical or optical inputs.

Still another object of the invention is to provide a selectively permeable barrier enabling ion communication between the probe and the soil, but obstructing migration of electrolyte liquids and soil constituents between the probe and the soil.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
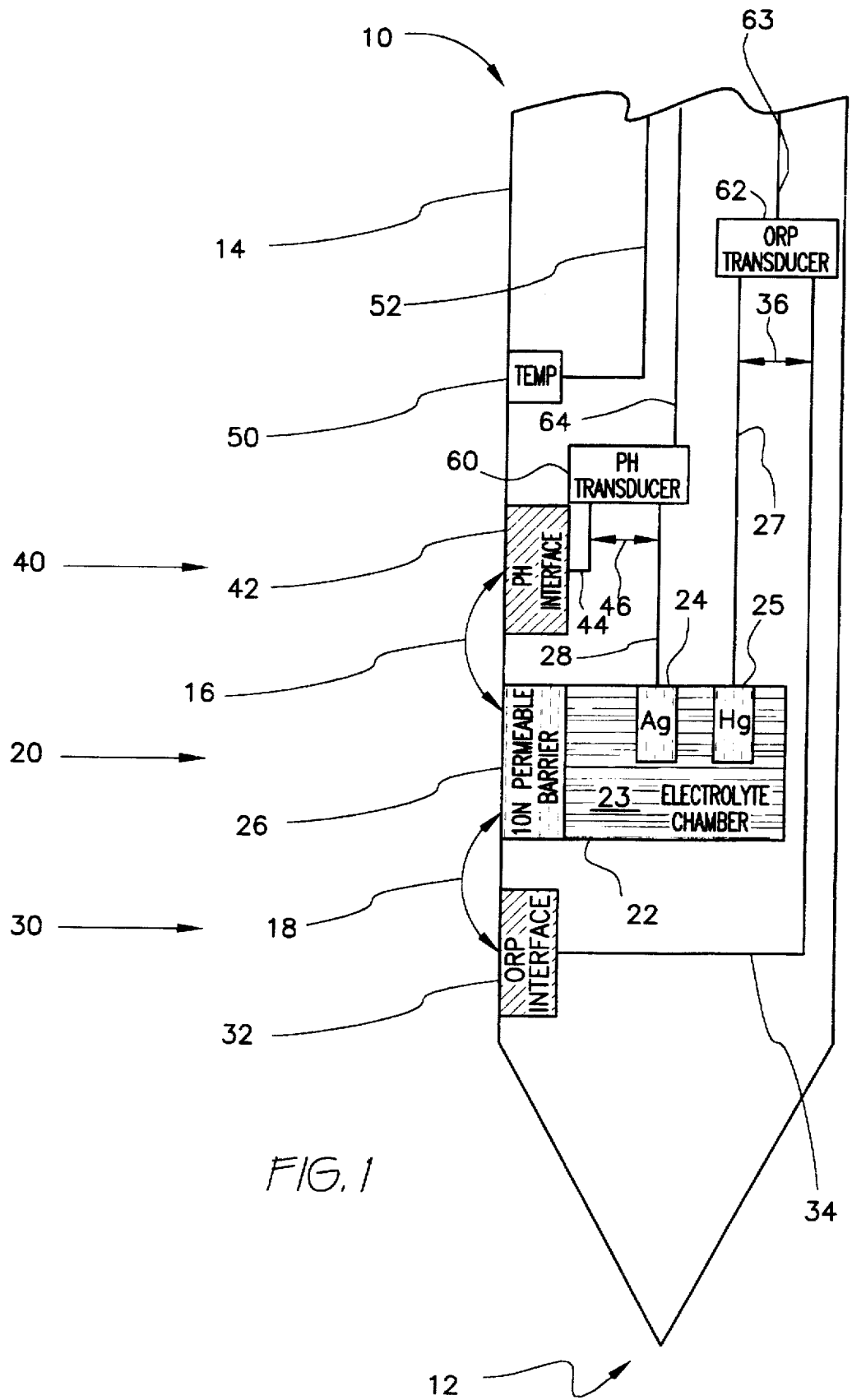
FIG. 1 is a diagrammatic, cross sectional view of the novel probe.

FIG. 1 shows the principal components of a first embodiment of novel probe 10. Probe 10 is a cone penetrometer having a sharp or pointed end 12 and a lateral wall 14. End 12 is shown as being conical, but may be of other configurations (not shown). For example, end 12 may have flat facets converging at a point. The precise configuration is not important, as long as it minimizes resistance as probe 10 is driven into the ground.

Contained within probe 10 and communicating to the exterior of wall 14 are a reference electrode 20, an ORP electrode 30, a pH electrode 40, and a temperature sensor 50. Temperature sensor 50 is of any suitable type, and allows data corresponding to pH and ORP to be analyzed in light of ambient ground temperature, so that correct assessments regarding actual values of pH and ORP may be made.

Reference electrode 20 comprises a walled electrolyte chamber 22 filled with an aqueous solution 23 of potassium chloride. A first receptacle 24 containing silver and silver chloride and a second receptacle 25 containing mercury and mercury chloride are disposed within electrolyte chamber 22.

A barrier 26 is disposed within probe 10 enabling communication between chamber 22 and soil (not shown) into which probe 10 has penetrated. Barrier 26 is exposed both to electrolyte contained within chamber 22, and to external soil, and prevents contamination of electrolyte by substances contained within the soil. Also, bleeding of water from the electrolyte into the soil is prevented.

Barrier 26 is formed from a material which passes electrons and hydrogen ions, but obstructs molecular substances, particularly water. This may occur by forming pores within barrier 26 of such intricacy and surface properties that water and like substances are held by preferential affinity. Alternatively, the pores existing within barrier 26 may be of such small magnitude that the pores act by direct interference with molecular substances. Regardless of precise construction and mechanism of operation, barrier 26 passes charged particles and obstructs liquid substances from passing from chamber 22. Barrier 26 also prevents soil particles and water from entering chamber 22. Ceramic materials have proven effective in this capacity for fabricating barrier 26.

Partial circuits of charged particles are formed within chamber 22, for purposes of generating electrical signals indicative of ORP and pH conditions existing within the soil being investigated. These partial circuits are complemented by partial circuits for charged particles occurring in soil penetrated by probe 10, as indicated by arrows 16 and 18.

It is most desirable that the novel probe determine ORP within a site. To this end, ORP electrode 30 comprises an interface element 32 exposed to soil through wall 14 of probe 10, interface element 32 preferably being fabricated from platinum. Element 32 is connected by an associated electrical conductor 34 to transducer 62, forming a first partial electrical circuit.

A complementary second partial electrical circuit is formed by a conductor 27 connecting second receptacle 25 to transducer 62 and conductor 34. In the presence of ORP, or electron activity, within the soil, a voltage potential develops between the first and second partial electrical circuits, as indicated by arrow 36. This potential is converted into a data signal at transducer 62, which converts signals generated by potential between electrodes 20 and 30 into data compatible with a microprocessor (see FIG. 2). The data signal is transmitted to the microprocessor by a communications cable 63.

Having thus described determination of ORP, the discussion will turn to determination of pH. Receptacle 24 of reference electrode 20 is connected to an electrical conductor 28, thus forming a third partial electrical circuit. A pH electrode 40 comprises an interface element 42, also exposed to soil through wall 14 of probe 10, and is preferably fabricated from antimony. Element 42 is connected to an associated electrical conductor 44, forming a fourth partial electrical circuit complementing the third partial circuit.

A signal indicative of pH, or hydrogen ion activity, is generated by the third and fourth partial electrical circuits, this resulting from a voltage potential developed between conductors 28 and 44. The voltage potential is indicated by arrow 46. Transducer 60 generates a data signal responsive to this potential, which data signal is transmitted to the microprocessor by a communication cable 64.

Signals corresponding to temperatures detected by temperature sensor 50 are transmitted to the microprocessor by communications cable 52. It will be understood that conductors 27, 28, 34, and 44, and communication cables 52, 63, and 64 are appropriately insulated from contact with other conductors. Thus, data signals indicative of ORP, pH, and local temperature are derived on site and transmitted to storage.

The electrochemical apparatus described above for generating signals is advantageous since it is passive in nature, with respect to requiring energy inputs from an external energy source. Thus, no electrical power source is required for successful operation, and the probe body is not encumbered by power conductors.

Reference electrode 20, ORP electrode 30, pH electrode 40, and temperature sensor 50 are frictionally fit or threaded into the body of probe 10. Similarly, receptacle 24 and barrier 26 are frictionally fit or threaded into the glass walled body of chamber 22.

Locations of the electrodes and temperature sensor in vertically stacked fashion, as depicted in FIG. 1, is preferred. Since probe 10 is to be driven forcibly into the ground, strength of the body of probe 10 for resisting damage when being forced into the ground must be maximized. Staggering these components about the exterior of probe 10 would likely reduce strength of the probe.

Figure 2:
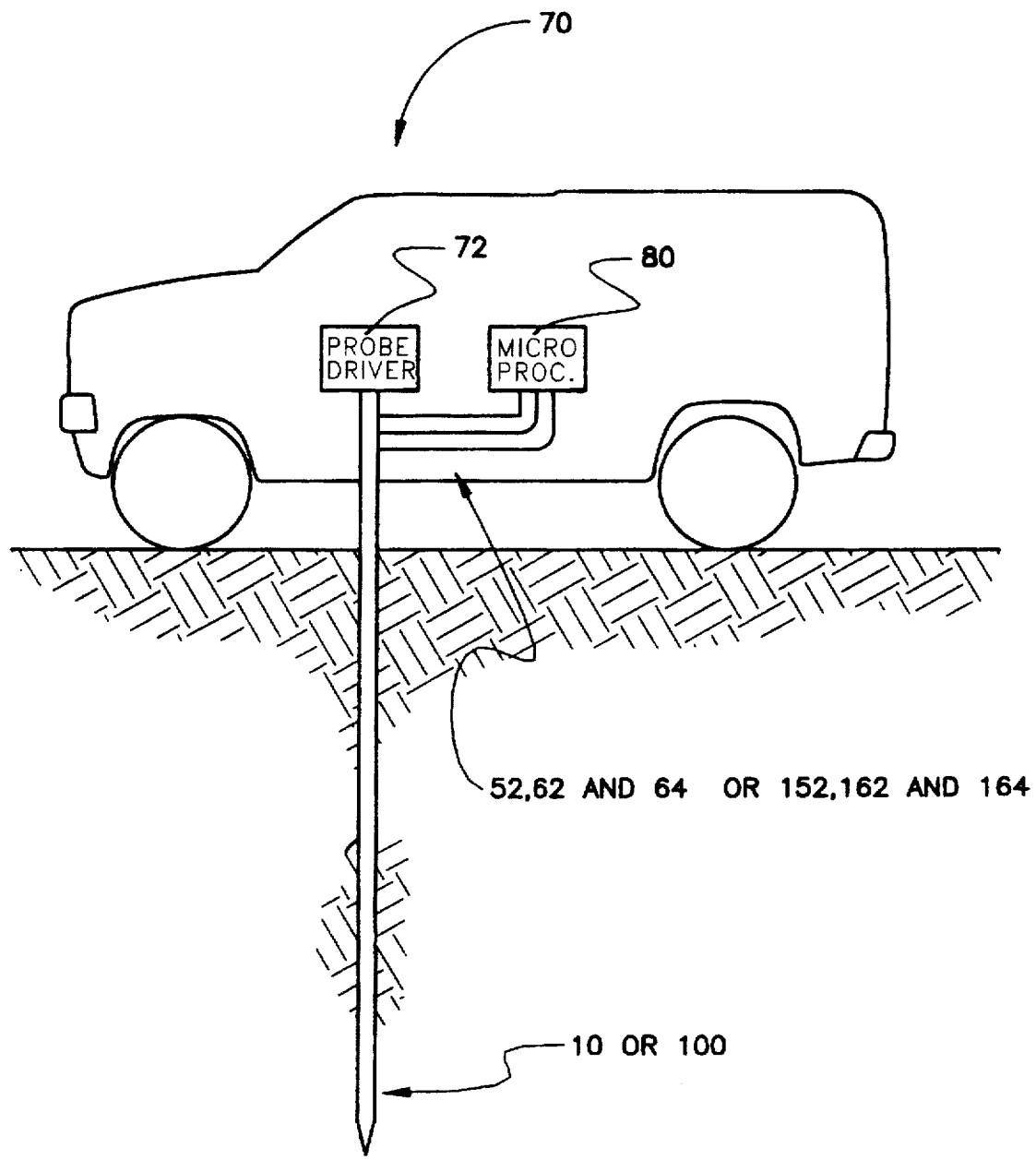
FIG. 2 is a diagrammatic, environmental view of a motor vehicle fitted with the novel probe.

Turning now to FIG. 2, a motorized vehicle 70 carries conventional apparatus 72 for driving probe 10 into the soil at a site being investigated, and a microprocessor 80, which provides automated data processing and associated memory. Probe 10 is extended by adding additional sections (not separately shown). The sections are slotted or otherwise formed to accommodate passage of communication cables. Methods of driving the probe into the ground and apparatus for doing this are well known, and will not be set forth in greater detail herein.

Data signals are received by connection of the various communication cables 52, 63, and 64 to microprocessor 80, and stored for subsequent retrieval on demand, as for example, for printing or other graphic rendition of the data, or for transfer to another automated data handling device (not shown).

Thus, data relating to pH and ORP may be immediately and accurately obtained when the vehicle 70 arrives at a site being investigated for these conditions. The vehicle is driven over the site and the probe 10 is driven into the ground at selected points of the site. Data is generated and transmitted instantaneously to the microprocessor as the probe 10 is driven progressively into the soil. Conditions at various points and at various depths are determined and recorded. A three dimensional profile of the site characterization is thus quickly and inexpensively obtained.

Variations and modifications to the embodiments presented above will occur to those of skill in the art. The metals forming the interfaces may be other than antimony and platinum, provided the substitute metals exhibit appropriate electrical activities, and, preferably, mechanical and chemical properties. The metals and metal salts of the reference electrodes may likewise be varied as desired.

The transducer may comprise plural transducers. All transducers may, if desired, be located outside the probe, for example, proximate the microprocessor. Communication between the probe and the microprocessor may be replaced in whole or in part by radio link.

It is to be understood that the present invention is not limited to the embodiments described above, but encompasses any and all embodiments within the scope of the following claims.

We claim:

1. A ground penetrating probe for determining in situ oxidation-reduction potential and pH characteristics of soils in a single pass, said probe comprising:

a cone penetrometer having a lateral wall and a pointed end;

a reference electrode having first means for establishing a first partial electrical circuit for generating a signal responsive to an electrical potential, said reference electrode disposed within said cone penetrometer and exposed upon said lateral wall of said cone penetrometer;

an oxidation-reduction potential electrode disposed within said cone penetrometer and exposed upon said lateral wall of said cone penetrometer, said oxidation-reduction potential electrode having second means for establishing a second partial electrical circuit complementing said first partial electrical circuit to generate signals responsive to electron activity within the soil when said probe is inserted into soil exhibiting electron activity, and indicative of the level of electron activity, said first means and said second means comprising passive electrochemical apparatus for generating said signals in the absence of an external energy source, a receptacle containing an electrolyte chamber containing electrolyte, said receptacle disposed within said cone penetrometer, and an ion permeable barrier located between said electrolyte and the exterior of said cone penetrometer and disposed to maintain electrolyte within said chamber and to prevent soil components from entering said chamber; and a PH electrode disposed within said cone penetrometer and exposed upon said lateral wall of said cone penetrometer, said pH electrode having third means for establishing a third partial electrical circuit complementing said first partial electrical circuit to generate a signal responsive to hydrogen ion activity within the soil when said probe is inserted into soil exhibiting hydrogen ion activity, said first means and said second means combining to form an electrical circuit generating a first signal responsive to presence of oxidation-reduction potential, and said first means and said third means combining to form a second electrical circuit generating a second signal responsive to hydrogen ion activity, wherein oxidation-reduction potential and pH characteristics are determined in a single pass with said probe.

2. The probe according to claim 1, further comprising a temperature sensor disposed within said cone penetrometer, said temperature sensor having means for generating a signal indicative of sensed temperature.

3. The probe according to claim 1, further comprising:

fourth means for automated data processing and memory, for storing and reproducing data;

fifth means for converting said signals generated by said reference electrode and said oxidation-reduction potential electrode into data compatible with said fourth means; and sixth means for conducting said signals generated by said reference electrode and by said oxidation-reduction potential electrode from said fifth means to said fourth means.

4. The probe according to claim 1, further comprising means for driving said probe into the ground.

5. The probe according to claim 1, said reference electrode and said oxidation reduction potential electrode being arranged in vertically stacked orientation within said probe.

* * * * *